US010866176B2

(12) United States Patent
Ramasubbu et al.

(10) Patent No.: US 10,866,176 B2
(45) Date of Patent: Dec. 15, 2020

(54) TESTING SYSTEM WITH REAL-TIME COMPENSATION OF VARYING SYSTEM PARAMETERS

(71) Applicant: Illinois Tool Works Inc., Glenview, IL (US)

(72) Inventors: Sunder Ramasubbu, Bangalore (IN); Somayya Ammanagi, Bangalore (IN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/311,846

(22) PCT Filed: Jun. 8, 2017

(86) PCT No.: PCT/IB2017/053388
§ 371 (c)(1),
(2) Date: Dec. 20, 2018

(87) PCT Pub. No.: WO2018/002747
PCT Pub. Date: Jan. 4, 2018

(65) Prior Publication Data
US 2019/0204193 A1 Jul. 4, 2019

(30) Foreign Application Priority Data

Jun. 29, 2016 (IN) .............................. 201641022254

(51) Int. Cl.
*G01N 3/10* (2006.01)
*G01L 5/10* (2020.01)
(Continued)

(52) U.S. Cl.
CPC .................. *G01N 3/10* (2013.01); *G01L 5/10* (2013.01); *G05B 13/025* (2013.01); *G05D 15/01* (2013.01);
(Continued)

(58) Field of Classification Search
None
See application file for complete search history.

(56) References Cited

U.S. PATENT DOCUMENTS 5,374,884 A * 12/1994 Koren .................... G05B 19/19
318/632
5,511,431 A 4/1996 Hinton
(Continued)

FOREIGN PATENT DOCUMENTS

AT 414176 9/2006
CN 1410752 4/2003
(Continued)

OTHER PUBLICATIONS

Int'l Search Report and Written Opinion Appln. No. PCT/IB2017/053388 dated Nov. 28, 2017 (9 pgs).
(Continued)

*Primary Examiner* — Natalie Huls
*Assistant Examiner* — Jermaine L Jenkins
(74) *Attorney, Agent, or Firm* — McAndrews, Held & Malloy, Ltd.

(57) ABSTRACT

A test system for testing a specimen include (a) a set of actuators for applying a desired time history of load to a specimen, (b) a drive unit connected to each actuator, (c) power generating elements (current/pneumatic/hydraulic) and (d) a controller connected to the drive units, the controller generates a drive signal for the drive unit based on feedback received from output of the specimen and an error derived from the feedback and an input command. The controller generates the drive signal by compensating varying system parameters which are introduced due to nonlinear response of the test system and the specimen, wherein the controller does not require (i) additional measured variable
(Continued)

other than a feedback received from the specimen and (ii) a numerical model of the test system and the specimen.

16 Claims, 13 Drawing Sheets

(51) Int. Cl.
  *G05D 15/01* (2006.01)
  *G05B 13/02* (2006.01)
(52) U.S. Cl.
  CPC ............ *G01N 2203/0202* (2013.01); *G01N 2203/0676* (2013.01)

(56) References Cited

U.S. PATENT DOCUMENTS

| | | | | |
|---|---|---|---|---|
| 6,094,602 | A * | 7/2000 | Schade, III | G05B 5/01 700/29 |
| 6,098,465 | A * | 8/2000 | Matsumoto | G01N 3/10 73/808 |
| 6,880,385 | B2 * | 4/2005 | Esser | G01N 3/08 73/826 |
| 7,031,949 | B2 * | 4/2006 | Lund | F16F 15/02 700/30 |
| 7,142,930 | B2 * | 11/2006 | Shimada | G05B 5/01 700/29 |
| 10,253,841 | B2 * | 4/2019 | Lee | G05D 19/02 |
| 2004/0020279 | A1 | 2/2004 | Degertekin et al. | |
| 2006/0070457 | A1 | 4/2006 | De Lair | |
| 2010/0229652 | A1 | 9/2010 | Jeppesen et al. | |
| 2011/0054354 | A1 | 3/2011 | Hunter | |
| 2011/0288791 | A1 | 11/2011 | Jeppesen et al. | |
| 2012/0133448 | A1 | 5/2012 | Gregg et al. | |
| 2015/0073601 | A1 * | 3/2015 | Gunness | G05B 17/02 700/275 |

FOREIGN PATENT DOCUMENTS

| | | |
|---|---|---|
| CN | 1484118 | 3/2004 |
| CN | 101506639 | 8/2009 |
| CN | 102032640 | 4/2011 |
| CN | 103003682 | 3/2013 |
| CN | 104011525 | 8/2014 |
| CN | 105264445 | 1/2016 |
| GB | 2501565 | 10/2013 |
| JP | H10222206 | 8/1998 |
| WO | 2014036010 A | 3/2014 |

OTHER PUBLICATIONS

European Office Communication with Supplemental Search Report Appln No. 17819436.1 dated Mar. 6, 2020 (7 pgs).

* cited by examiner

TESTING SYSTEM WITH REAL-TIME COMPENSATION OF VARYING SYSTEM PARAMETERS

FIELD OF INVENTION

The present invention relates to a testing system and method of controlling the testing system for testing a specimen and more particularly relates to a controller of the testing system which accounts for real-time compensation of varying system parameters which are introduced due to non-linear response of the testing system and the specimen.

BACKGROUND OF THE INVENTION

Servo-controlled processes are typically driven by the well-known PID scheme involving Proportional[P(t)], Integral [I(t)] and Differential [D(t)] gains on the servo loop that feeds Servo-output [C(t)] to the servo-drive towards elimination of error given as difference between desired (Command) readout and actual (Feedback) readout of the process parameter being controlled. Linear systems are typically those that exhibit constant rate of change in Feedback $$\left([y(t)], \left[\frac{d}{dt}y(t)\right]\right)$$

as a function of given Servo-output. In this case, the system can be tuned optimally for best performance with a set of PID gains. This will however not be adequate in the event a system exhibits nonlinear or unstable response, i.e., if $$\left[\frac{d}{dt}y(t)\right]$$

cannot be unique for a given value of [C(t)]. This may be the case in servo controlled mechanical test systems designed to apply load on a test coupon subject to static or cyclic loading. In such systems, a so-called stiffness correction is introduced to account for nonlinear response. It relies on the measurement of displacement [s(t)] (actuator position) and load [f(t)] experienced by the specimen and in order to continuously correct the overall PID output by increasing or decreasing it in proportion to $$\frac{\Delta f}{\Delta s}$$

as a function of time.

The servo controlled test systems used in mechanical testing of specimens, ranging from simple test coupons to complex structure or a sub-structure, demand the use of single or multiple independently acting actuators as well as the application of both static and dynamic loads. Such conditions can induce severe distortions of instantaneous system response due to inertial, dissipative or restoring forces. Such response can restrict applied rates of loading even after correction of PID gains to account for change in specimen stiffness: a problem often encountered in multi-channel structural testing in load control. Accurate application of the desired loads on the specimen, over a wide range of load levels and frequencies, becomes difficult due to several reasons, to name a few:

(R1) the specimen undergoes changes in geometrical dimensions and material properties leading to geometric and material nonlinearities;
(R2) dissipation of energy among the control elements leading to under loadings;
(R3) actuator-structure interaction which adds energy to the system leading to overloading or control instability.

In this scenario, it is important to account for dynamics of the test system as well as specimen, such that, control elements can impart the desired loads accurately.

Most of the commercial, off-the-self available material or structural dynamic test systems have control systems based on Proportional-Integral-Derivative (PID) control algorithm. The success of these control systems is limited to small range of load levels and frequencies conforming to linear behavior of specimen because these systems do not take into account the R1, R2 and R3 mentioned above. A class of new systems which is illustrated in FIG. 1 have accounted for R1 by using the modified Proportional-Integral-Derivative (PID) control method with an additional stiffness correction parameter to take into account changing properties of the material or structure. The various variables illustrated in FIG. 1 are as follows r(t):command; y(t): feedback; e(t)=r(t)−y(t):error; c(t):controller output; v(t): servo drive output; u(t):force imparted by the actuator; y(t):force experienced by the specimen.

In this system 100 the additional parameter, the dynamic stiffness, is measured in terms of flexibility: the ratio of the change in displacement to the change in feedback. This requires the system 100 in load control to measure displacement also. The output of the PID controller multiplied by this ratio (flexibility) takes into account, during the test, the variable stiffness of the specimen. During the test if specimen becomes very stiff the change in load feedback corresponding to a small change in displacement will be very high and hence the control gains, driving the servo output, need to be reduced. As the measured flexibility, the reciprocal of stiffness, for stiff specimen is low the multiplication of servo output with it will suitably adjust actuator response to suit instantaneous specimen stiffness. Similarly, when specimen is very flexible i.e., the change in displacement corresponding to a small change in load is large, the control gains, which control servo output, need to be increased. Thus the measured flexibility, the multiplication of it with the servo output, takes into account the increased demand on actuator movement. This is how the adaptive control of the test system 100 during dynamic testing of the specimen with variable stiffness is achieved and is shown in FIG. 1. Since the effective measured flexibility depends on the measured feedbacks, both displacement and force, it will be having a lag of at least 10-100 milliseconds, depending on the type of servo drive. This will limit the maximum frequency that can be achieved in adaptive control and also effectiveness of the adaptive control is diminished by inevitable noise in stroke displacement signal that gets immensely magnified in the process of computing the derivative. In the case of multi-channel structural testing (for example aircraft structure testing which requires several actuators operating in load control) the cost of additional response (displacement) measurement channel, to increase the operating frequency with stiffness correction parameter, may be unacceptably high due to requirements of additional sensors, signal-conditioners and high performance data acquisition systems.

FIG. 2 illustrates another typical test system 200 which includes model reference based control method which accounts for even R2 and R3 by including the approximate model of the entire test system and specimen. The various parameter referred in the FIG. 2 are as follows r(t):command; y(t):feedback; e(t)=r(t)–y(t):error; c(t):controller output; v(t):servo drive output; u(t):force generated by the actuator; y(t):force experienced by the specimen; $y_m(t)$: response of the model; $e_m(t)$=r(t)–$y_m(t)$:error. In this system 200, the given excitations are applied to both reference model and the actual system and then based on the comparison of the estimated responses from the numerical model and measured responses of the actual system, the system parameters of the numerical model are updated. This reference model is now used in predicting the response of the system and also modifying the parameters of the controller as shown in FIG. 2. However, the implementation of this reference model based control algorithm demands very sophisticated computational processors and also the success of it depends on the rate of convergence of the updated model parameters and their accurate modeling. Furthermore, such control algorithms with complex numerical model of the system are not viable for high performance real-time control of the system for which it is essential to account for R1, R2 and R3 given the latency of 10-100 ms in servo-response. Accordingly, the existing control algorithms as illustrated in FIGS. 1 & 2 are essentially "hindsight" control systems.

Accordingly, there is a need in that art to provide a solution to one or more of above said problems. The present invention is found to have potential to address the above mentioned problems in a unique and economical manner.

SUMMARY OF THE INVENTION

The object of the present invention is to provide a system which substantially overcomes the above mentioned disadvantages.

The main object of the present embodiment is to present the system and method for testing a specimen by accounting real-time stiffness correction of the specimen.

The present embodiment is based on continuous predictive system response computation. This is in contrast to prior art methods that are based on 'hindsight' system response. Thus, the present embodiment involves continuous assessment of how the system is likely to respond to current servo-output and suitably updating PID gains. This is shown to ensure not only high fidelity in response to command signal but also significant reduction tending to zero, of the phase lag between command and feedback. The present embodiment uses only the basic measured values of the PID control system without recourse to additional measured variables and/or numerical model of the system unlike as needed in the prior art methods The present embodiment involves a method to predict system response (stiffness), which will account for changing system and specimen parameters over wide range of load levels and frequencies, and estimating the modified input to the control elements such that high fidelity is maintained in applying desired input loads to the system. The present embodiment precludes the need to assess instantaneous system stiffness either from strain or actuator stroke feedback. In fact, it does not require any feedback other than the feedback that needs to be servo controlled. The present embodiment involves predictive rather than 'hindsight' system response assessment and hence practically eliminates latency in servo response. Further, the present embodiment does not require any feedback measurement other than the current control feedback. Specifically, stroke or deformation/strain feedback is rendered irrelevant to the quality of Load control. The present embodiment is readily extendable from single channel to multi-channel control systems without change, because no parameters, other than the current feedback and command on individual channels, are required to drive the control algorithm for that channel.

The present embodiment is based on continuous correction of PID gain, but without recourse to estimating $$\frac{\Delta f}{\Delta s}.$$

The only measurement required for this embodiment to operate is current Feedback readout, be it Force, Strain, or Position. The required PID gain correction is performed on a "predictive" basis with 'look ahead' capability, thereby allowing improved quality of servo control than is possible using conventional means.

BRIEF DESCRIPTION OF THE ACCOMPANYING DRAWINGS

The advantages and features of the invention will become more clearly apparent from the following description which refers to the accompanying drawings given as non-restrictive examples only and in which.

Figure 11A:
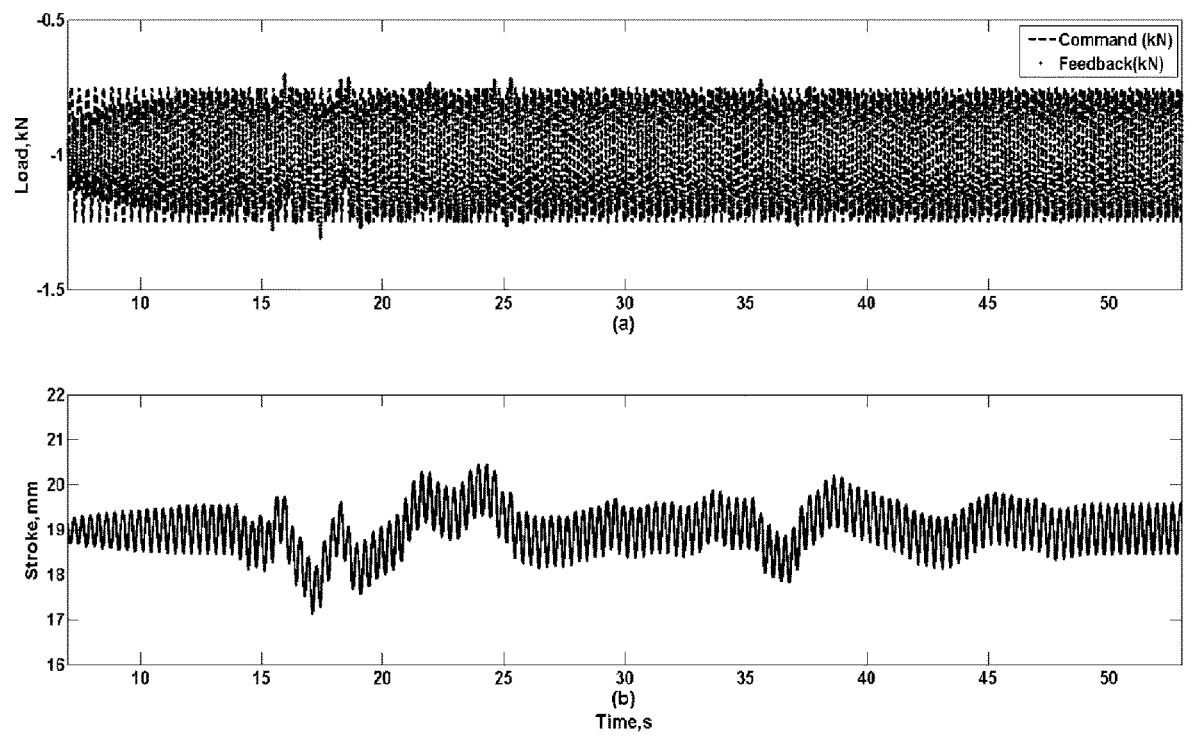
FIGS. 11A-11C illustrate time histories of the top actuator displacement and the load for the loading case DED1, using control schemes listed in Table 3.
Figure 11B:
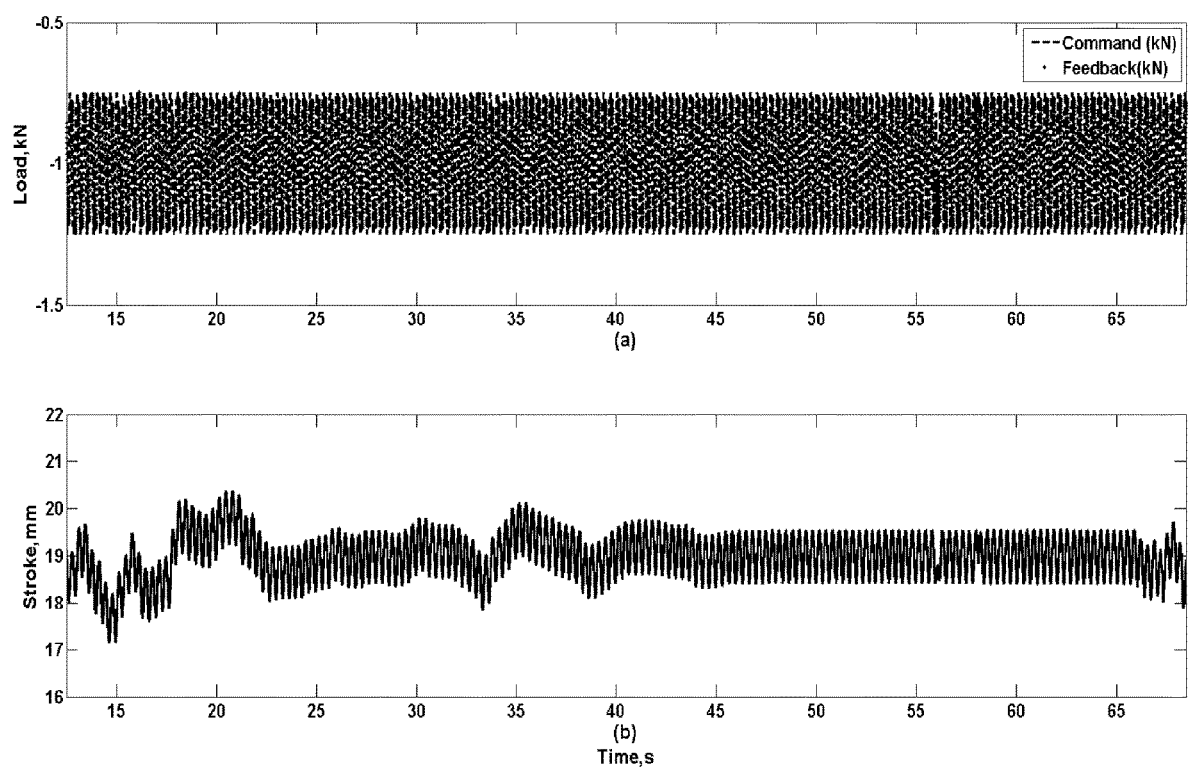
Figure 11C:
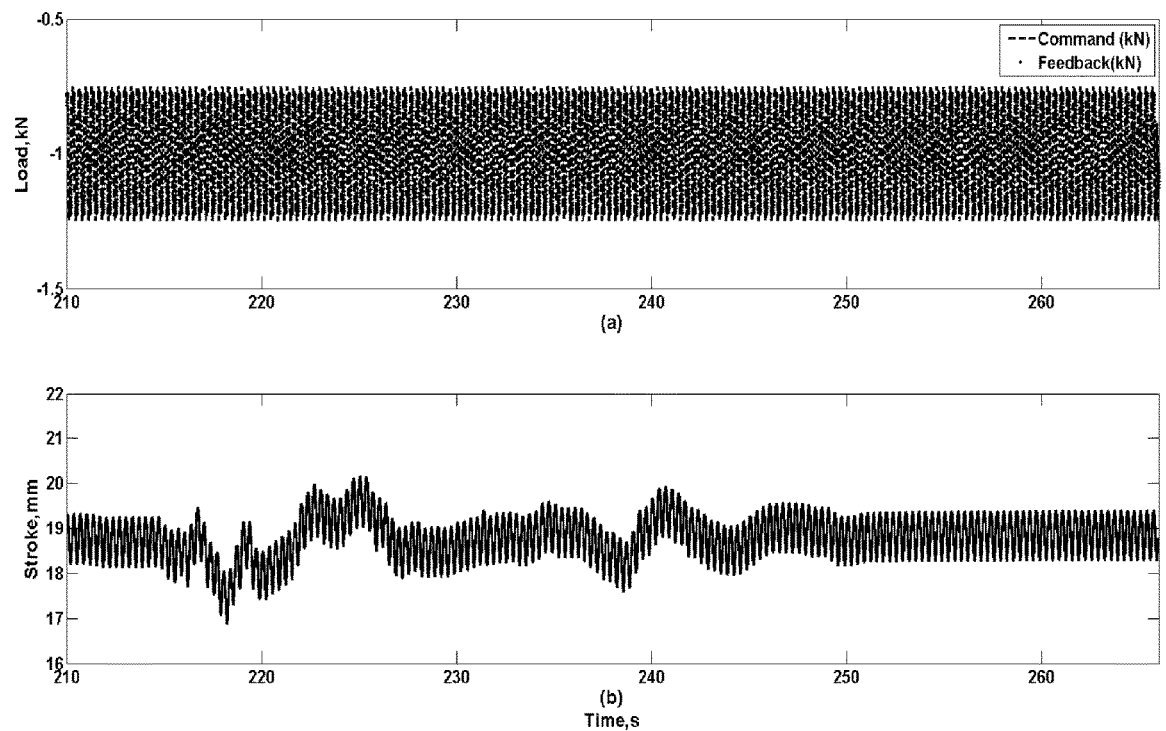
Figure 11D:
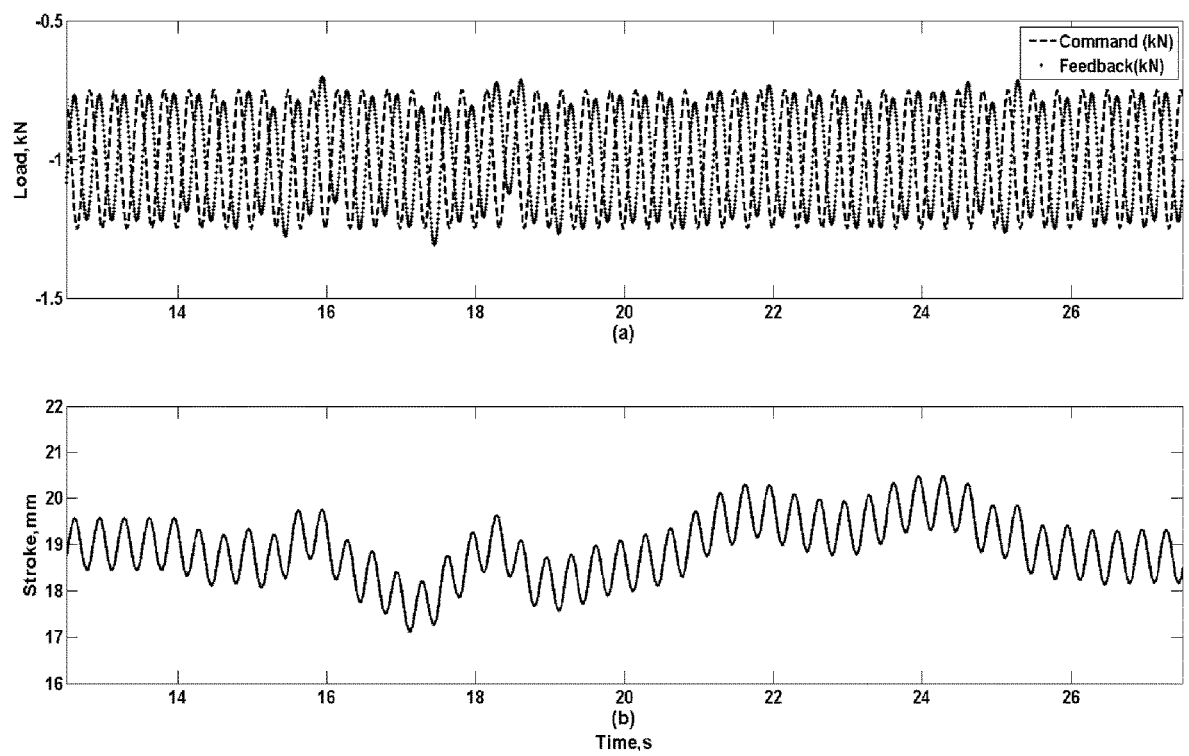
Figure 11E:
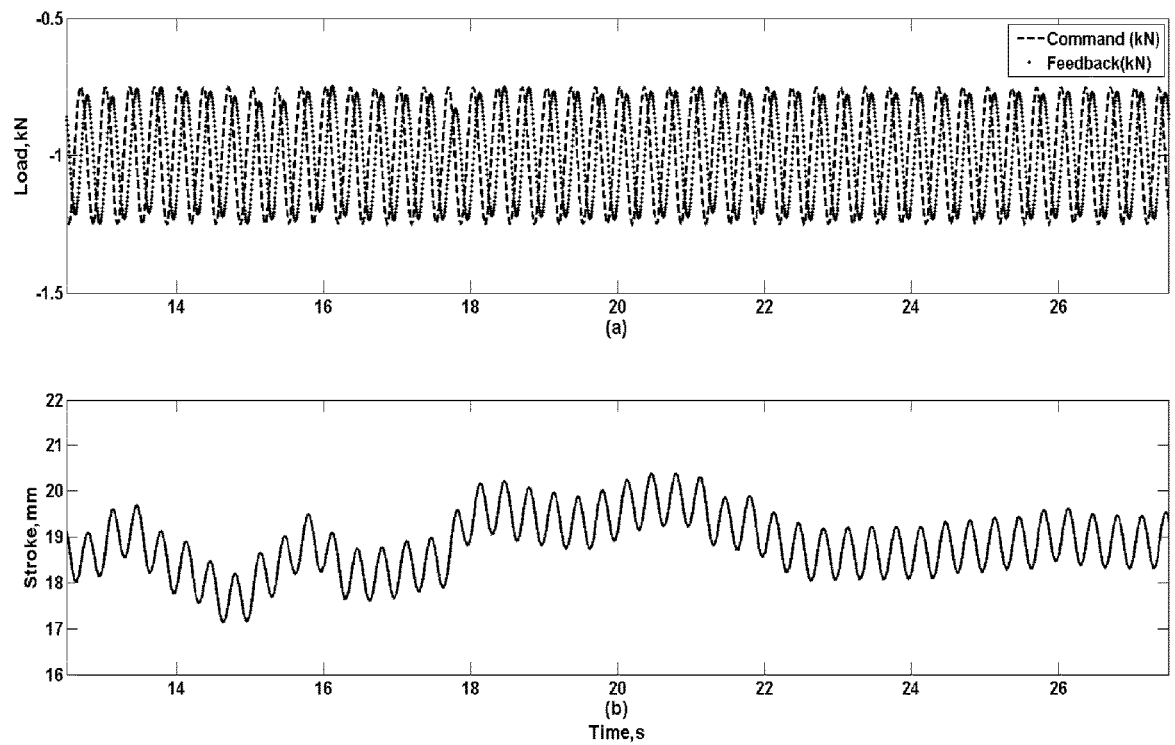
Figure 11F:
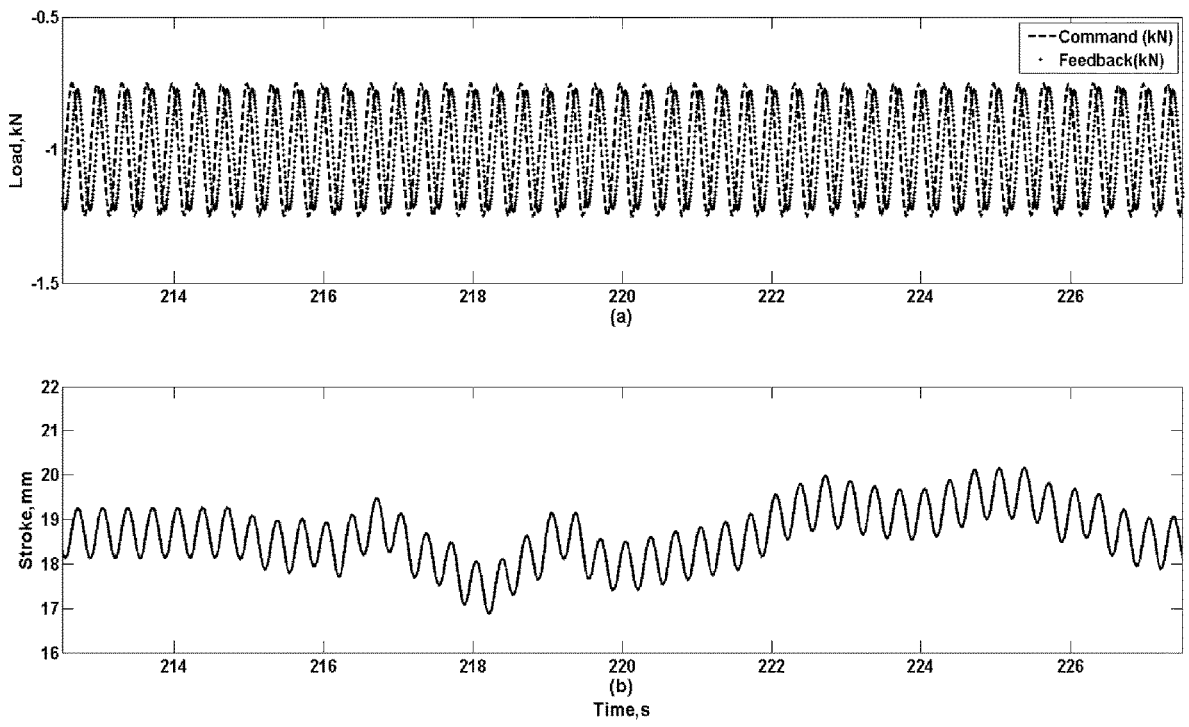
Figure 12:
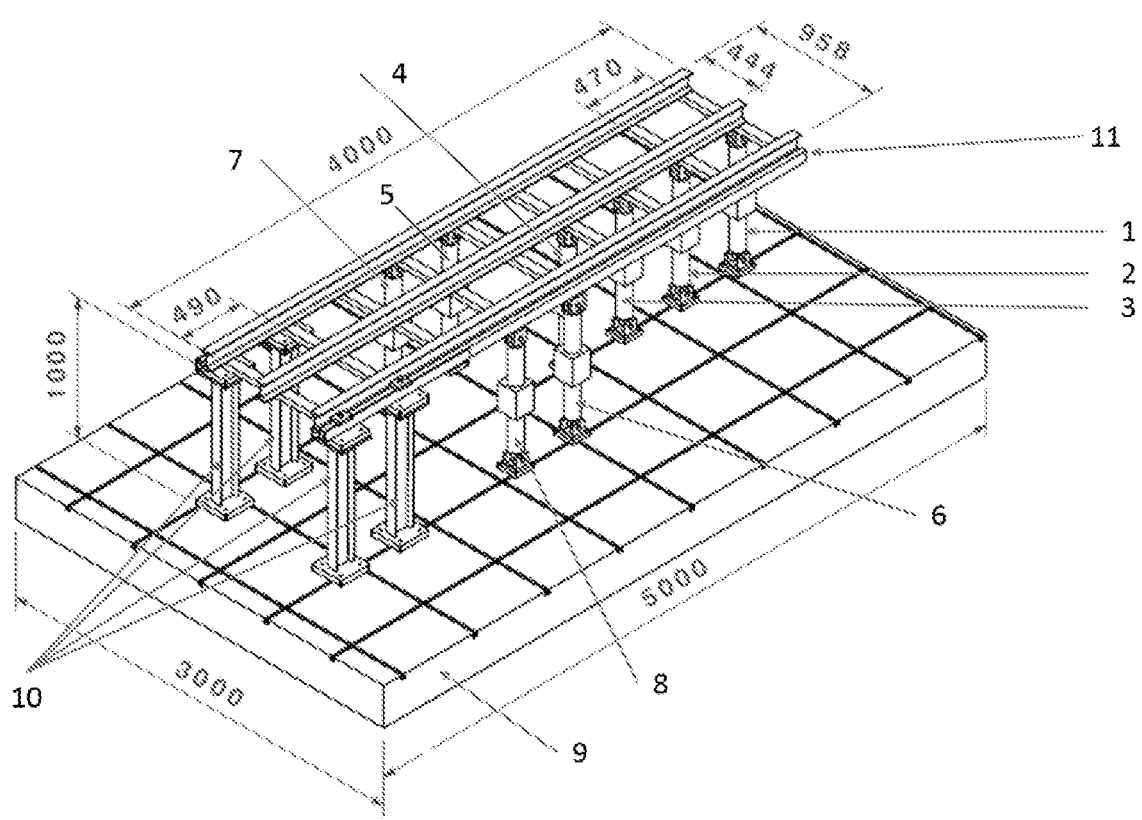
Figure 13:
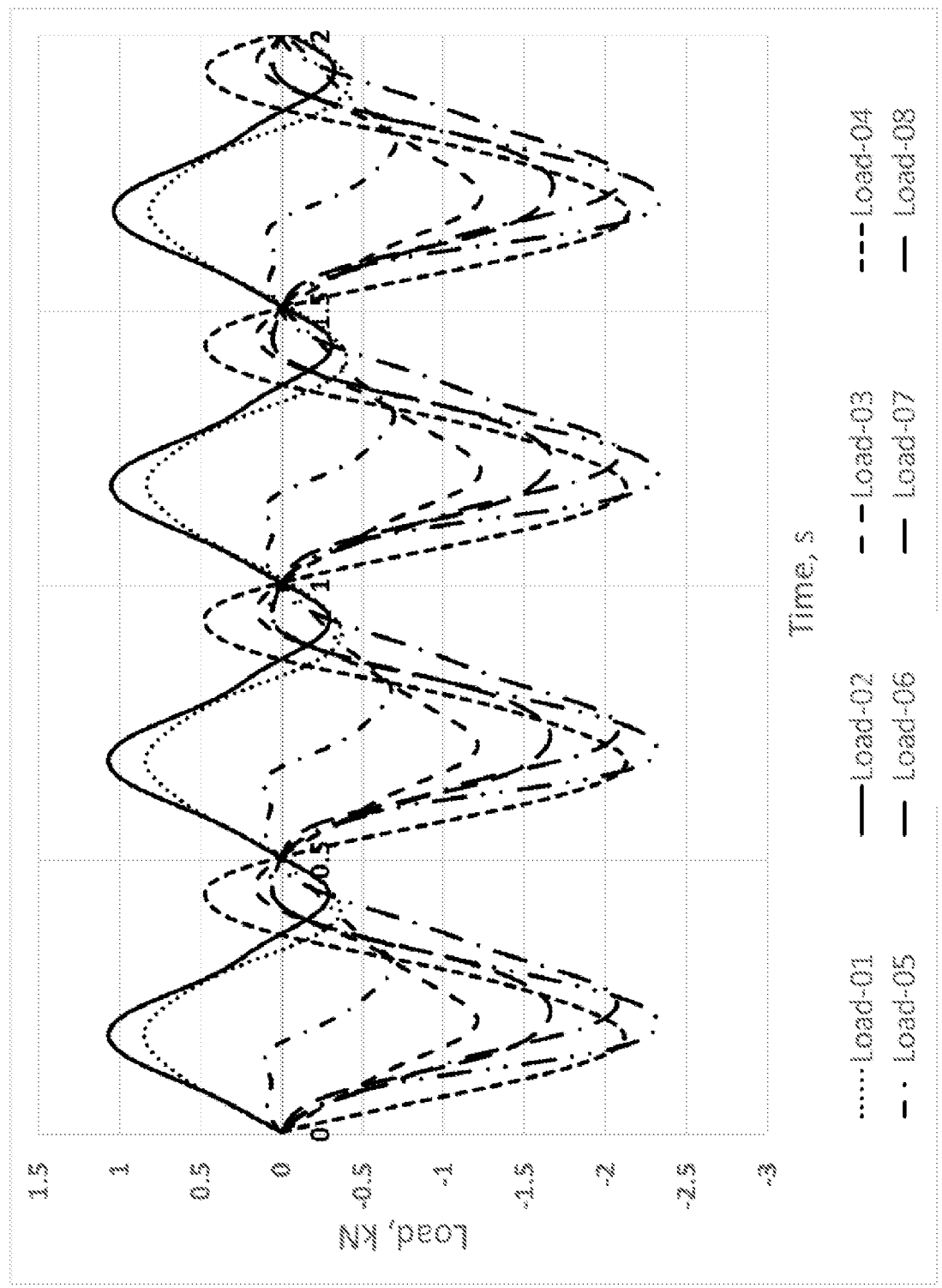

FIGS. 11D-11F respectively show close-up of FIGS. 11A-11C;

FIG. 12 shows a test rig on which the proposed control scheme is implemented to demonstrate the simulation of loads on aircraft wing-like ladder structure, wherein the distributed load on the cantilever wing structure is simultaneously applied and controlled using multiple actuators;

FIG. 13 shows the measurement of distributed loads simultaneously applied by all actuators on the wing structure as illustrated in FIG. 12;

DETAILED DESCRIPTION OF THE INVENTION

The present invention will be described herein below with reference to the accompanying drawings. A system and method for testing a specimen by accounting system parameters is described herein.

The following description is of exemplary embodiment of the invention only, and is not to limit the scope, applicability or configuration of the invention. Rather, the following description is intended to provide a convenient illustration for implementing various embodiments of the invention. As will become apparent later, various changes may be made in the function and arrangement of the structural/operational features described in these embodiments without departing from the scope of the invention as set forth herein. It should be appreciated that the description herein may be adapted to be employed with alternatively configured devices having different shaped, components, and the like and still fall within the scope of the present invention. Thus the detailed description herein is presented for purposes of illustration only and not of limitation.

Figure 1:
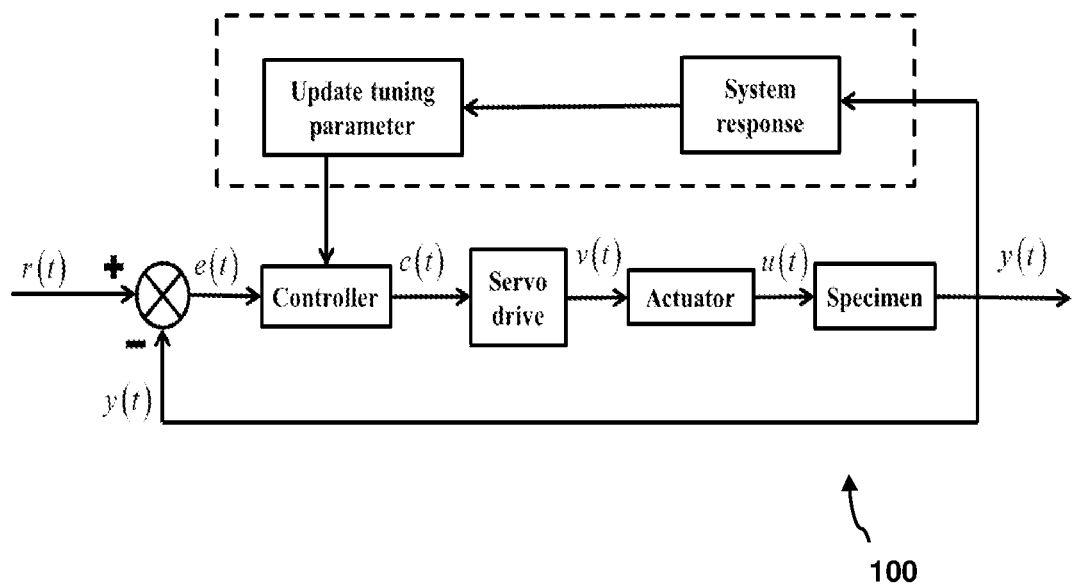
FIG. 1 illustrates a block diagram of control scheme in a typical testing system accounting for variable specimen stiffness.
Figure 2:
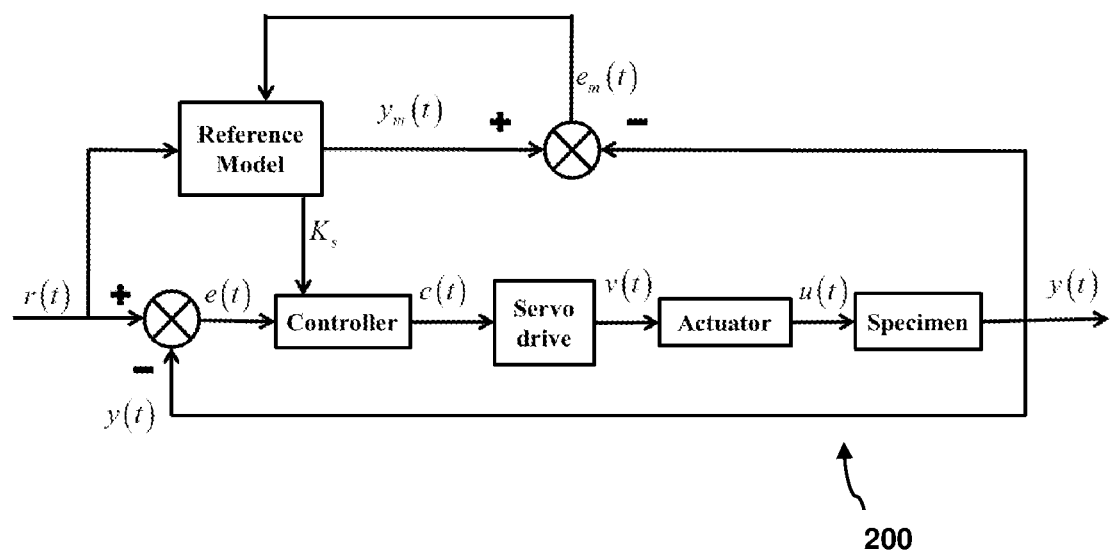
FIG. 2 illustrates a block diagram of control scheme in another typical testing system accounting for variable system parameters.
Figure 3:
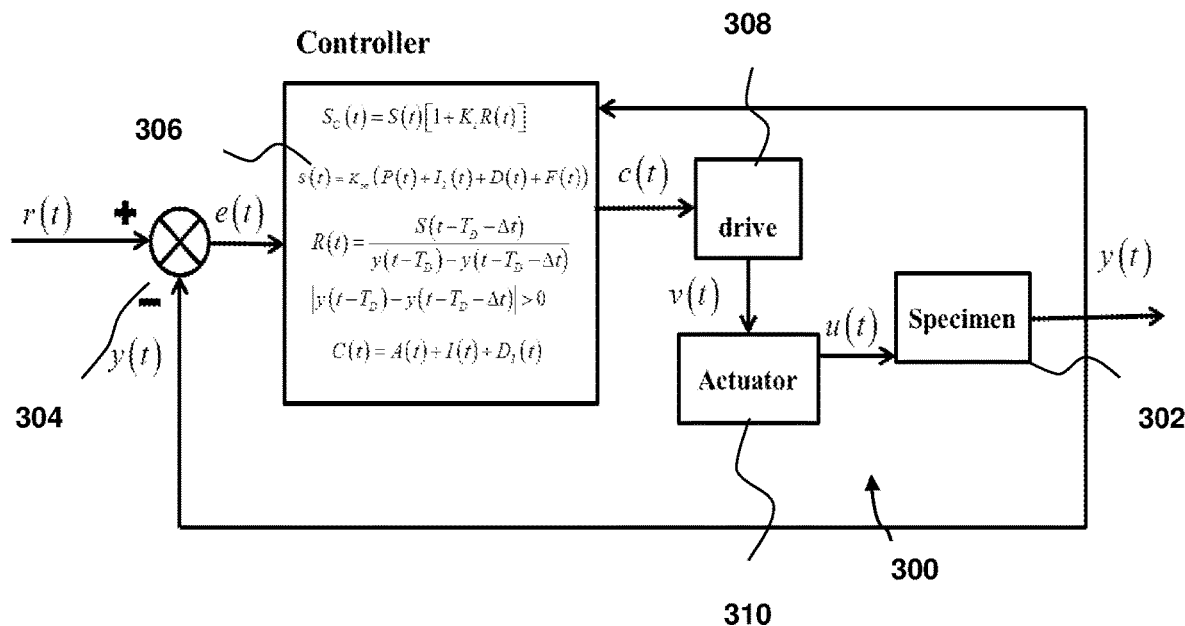
FIG. 3 illustrates a block diagram of control scheme in a testing system in accordance to an embodiment herein.
Figure 4:
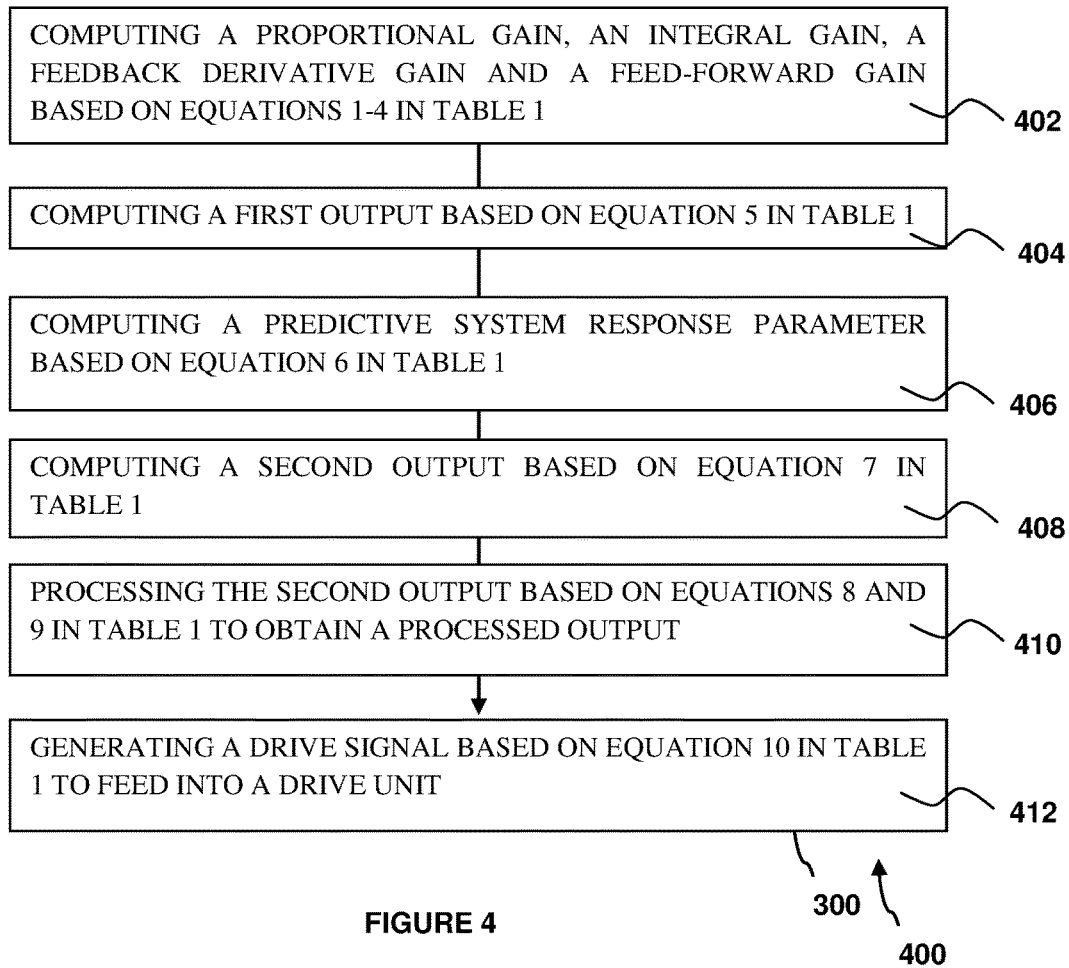
FIG. 4 is a flow diagram for generating a drive signal of FIG. 3 in accordance to an embodiment herein.

FIG. 3 illustrates a block diagram of a testing system 300 for testing a specimen 302 in accordance to an embodiment herein. The testing system 300 includes a summing junction 304, a controller 306, drive unit 308 and an actuator 310. The summing junction receives an input command r(t) and feedback y(t) from the specimen 302 and computes an error [e(t)=r(t)−y(t)]. The error e(t) is fed to the controller 306 and the controller 306 generates a drive signal c(t) which is fed to the drive unit 308 (for the illustration and description purpose the drive unit is considered as servo drive which can be electric servo drive or hydraulic servo valve or anything that drives the actuator. However, the present method proposed here can be implemented in any test system which drives the drive unit for testing the specimen). The drive unit 308 releases a drive output v(t) to the actuator 310 that imparts the force u (t) to the specimen 302. The specimen 302 experiences force y(t) which is measured and fed back to the controller 306 and the summing junction 302 as the feedback. The controller 306 generates a drive signal c(t) based on a control method which involves: (i) proportional; (ii) integral; (iii) feedback derivative; (iv) feed-forward; and (v) dither components. Table 1 provides analog and digital form of each of these components and the components derived from these basic components. FIG. 4 is a flow diagram for generating the drive signal of FIG. 3 in accordance to an embodiment herein.

TABLE 1

| Eq. No. | Component | Analog | Digital |
|---|---|---|---|
| 1 | Proportional | $P(t) = K_P e(t)$ | $P[n] = K_P e[n]$ |
| 2 | Integral (Infinite) | $I(t) = \frac{K_I}{t} \int_0^t e(t)\,dt \leq |MAX\_NULL|$ | $I[n] = \frac{K_I}{n} \sum_{i=0}^{n} e[i] \leq |MAX\_NULL|$ |
|  | Integral (finite) | $I_2(t) = \frac{K_{I_2}}{T_I} \int_{t-T_D}^{t} e(t)\,dt$ | $I_2[n] = \frac{K_{I_2}}{n_I} \sum_{i=n-n_I}^{n} e[i]$ |
| 3 | Feedback-derivative | $D(t) = -K_D T_D \frac{d}{dt}(y(t) - y(t - T_D))$ | $D[n] = -K_D n_D (y[n] - y[n - n_D])$ |
| 4 | Feed-forward | $F(t) = K_F T_D \frac{d}{dt}(r(t) - r(t - T_D))$ | $F[n] = K_F n_D (r[n] - r[n - n_D])$ |
| 5 | Servo output | $s(t) = K_{SG}(P(t) + I_2(t) + D(t) + F(t))$ | $S[n] = K_{SG}(P[n] + I_2[n] + D[n] + F[n])$ |
| 6 | Predictive system response parameter: | $R(t) = f[S(t - T_D), \Delta y(t - T_D)]$ | $R[n] = f(S[n - n_D], \Delta y[n - n_D])$ |
| 7 | Servo output corrected for predicted system response | $S_C(t) = S(t)[1 + K_s R(t)]$ | $S_C[n] = S[n](1 + K_s R[n])$ |
| 8 | Servo output corrected for bias | $B(t) = K_B S_C(t); K_B = F_G \pm B_G$ $B(t) \xrightarrow{To\ Binary} B_b(t) = M 2^E$ | $B[n] = K_B S_C[n]; K_B = F_G \pm B_G$ $B[n] \xrightarrow{To\ Binary} B_b[n] = M 2^E$ |
| 9 | Attenuated Servo output | $A_b(t) = B_b(t) 2^{(-2F_A + K_C)}$ $A_b(t) \xrightarrow{To\ Decimal} A(t)$ | $A_b[n] = B_b[n] 2^{(-2F_A + K_C)}$ $A_b[n] \xrightarrow{To\ Decimal} A[n]$ |

TABLE 1-continued

| Eq. No. | Component | Analog | Digital |
|---|---|---|---|
| 10 | Servo output with static null and dither components | $C(t) = A(t) + I(t) + D_f(t)$ | $C[n] = A[n] + I[n] + D_f[n]$ |

$S_C(t)$: stiffness corrected PIDF servo output i.e. $S(t) = P(t) + I_2(t) + D(t) + F(t)$ involving proportional, integral, derivative and feed-forward components respectively; $R(t)$: apparent flexibility; $T_D$: derivative time-constant; $A(t)$: attenuated component of servo output; $I(t)$: static null component; $D_f(t)$: dither component.

TABLE 2

| Sl. No. | Notation | Description |
|---|---|---|
| 1 | $r(t)$ & $r[n] = r(t_n)$ | Load command |
| 2 | $y(t)$ & $y[n] = y(t_n)$ | Load feedback |
| 2 | $e(t) = r(t) - y(t)$ & $e[n] = e(t_n)$ | Error |
| 3 | $K_P$ & $K_I$ | Proportional and integral (infinite) gain factors respectively on error |
| 4 | $K_D$ & $K_F$ | Derivative gain factors respectively on feedback and command |
| 5 | MAX_NULL | Limit on null to avoid saturation |
| 8 | $\Delta t = t_2 - t_1$ | Servo loop interval |
| 6 | $T_I = n_I \Delta t$ & $T_D = n_D \Delta t$ | Integral and derivative time constants |
| 7 | $K_{I_2}$ | Finite integral gain factor |
| 8 | $K_{SG}$ & $K_C$ | System (fine) gain and coarse gain respectively |
| 9 | $K_S$ | Gain factor on predictive flexibility ratio |
| 10 | $F_G$ & $F_A$ | Unbiased gain factor and maximum attenuation factor respectively |
| 11 | $B_G$ | System Gain Bias |
| 12 | $K_B$ | Biased gain factor |
| 13 | $D_f(t)$ | Dither component |
| 14 | M & E | Mantissa and exponential components of binary floating point number |

Note:
The values of the gain constants are obtained from basic manual tuning of sample linear specimen.

In Table 1, feed-forward component is expressed for the sake of completeness of the control scheme (present invention) otherwise it is maintained to be zero by setting $K_F=0$. Table 2 carries definition of variables used in Table 1 and FIG. 3. Conventional implementation of PID scheme typically includes the four components Equations 1-4. The Feed forward component in conventional schemes is typically used to reduce phase lag between Command and Feedback. This component is rendered redundant by the present invention because of the feed forward tendency inherent to any predictive scheme. However, for sake of description of the present embodiment, it is retained, though set to zero. The present embodiment parameter $R(t)$, obtained in Equation 6 computed from Feedback differential and servo output $S(t)$. The parameter $R(t)$, modifies the output: $S(t)$ of the controller 306, as shown in Equation 7 in Table 1, by adding the predictive system response component and moderated by a gain factor on predictive system response. The predictive (look ahead) nature of Equation 6 in Table 1 extends to a time frame given as the sum of latency in servo-drive response, actuator response and system mechanical response, apart from latencies associated with feedback measurement and servo output computation. This is because the consequences of servo-output component computed by Equation 5 in Table 1 will effectively be seen only after the stated sum of latencies. Therefore, system response computed as a two-variable function of this component and of latest measured differential feedback is predictive by nature because it not only accounts for instantaneous system stiffness, but also for potential variations in response of the servo-drive itself associated with nonlinearity, hysteresis, oil compressibility in servo-hydraulics, etc. The predictive system response parameter given by Equation 6 when introduced as gain correction into Equation 7 effectively corrects servo-response of the system in a manner that accounts for expected changes in system response. This output is then corrected for potential bias in servo-actuator response as in the case of unequal section and single ended servo-hydraulic actuators as shown in Equation 8 of Table 1, attenuated by a pre-set and user-defined System Gain Constant as in Equation 9 of Table 1 and summed with the servo-null and dither components [Equation 10 of Table 1] to be finally fed as input to the drive unit 308.

Figure 5:
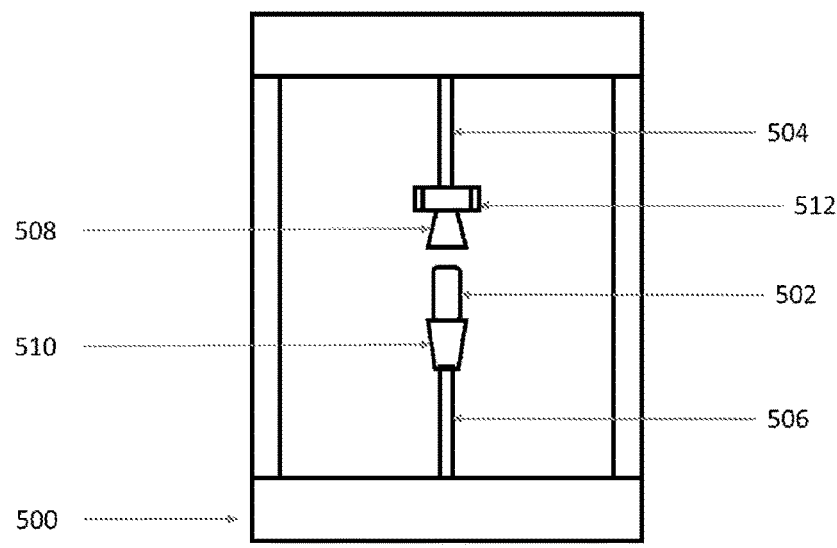
FIG. 5 illustrates a servo-hydraulic test system in accordance to an embodiment herein.

FIG. 5 illustrates a servo-hydraulic test system in accordance to an embodiment herein. The test system 500 has two co-axial actuators namely top actuator 504 and a bottom actuator 506. The top actuator 504 is instrumented with both force and displacement sensors 512. The top actuator 504 is exercised to validate Load Control against the specimen 502 bearing against the bottom actuator 506. The bottom actuator 506 operates independently under Stroke Control to simulate randomly variable system stiffness as perceived by the top actuator 504, including the extreme case of change in sign of system stiffness. A compression plates 508 and 510 are respectively fastened to actuators 504 and 406. The sample specimen 502 (shown as compression spring in the figure) is placed between these compression plates 508 and 510. The top actuator 504 is taken to apply controlled desired loads on the specimen 502. The bottom actuator 506 is taken to create external disturbance in terms of displacements. The top actuator, under various control schemes (listed in Table 3), is thereby tested for its ability to control the desired static or dynamic loads in the presence of cyclic or random displacement disturbance from the bottom actuator, is compared to show that the control scheme with present embodiment is superior to prior art (see Table 3). Note that in all the cases described below, feed-forward component was set to zero when employing predictive system response scheme.

The effectiveness of the present embodiment, in controlling the quasi-static load by the top actuator 504 in the absence of and also in the presence of dynamic displacement disturbances introduced by the bottom actuator 506 was studied. The records, provided below in the FIGS. 6-11 and its corresponding description, illustrate the ability of the present embodiment to overcome the effects of stick-slip and friction during reversals in reproducing the desired load waveform.

Figure 6A:
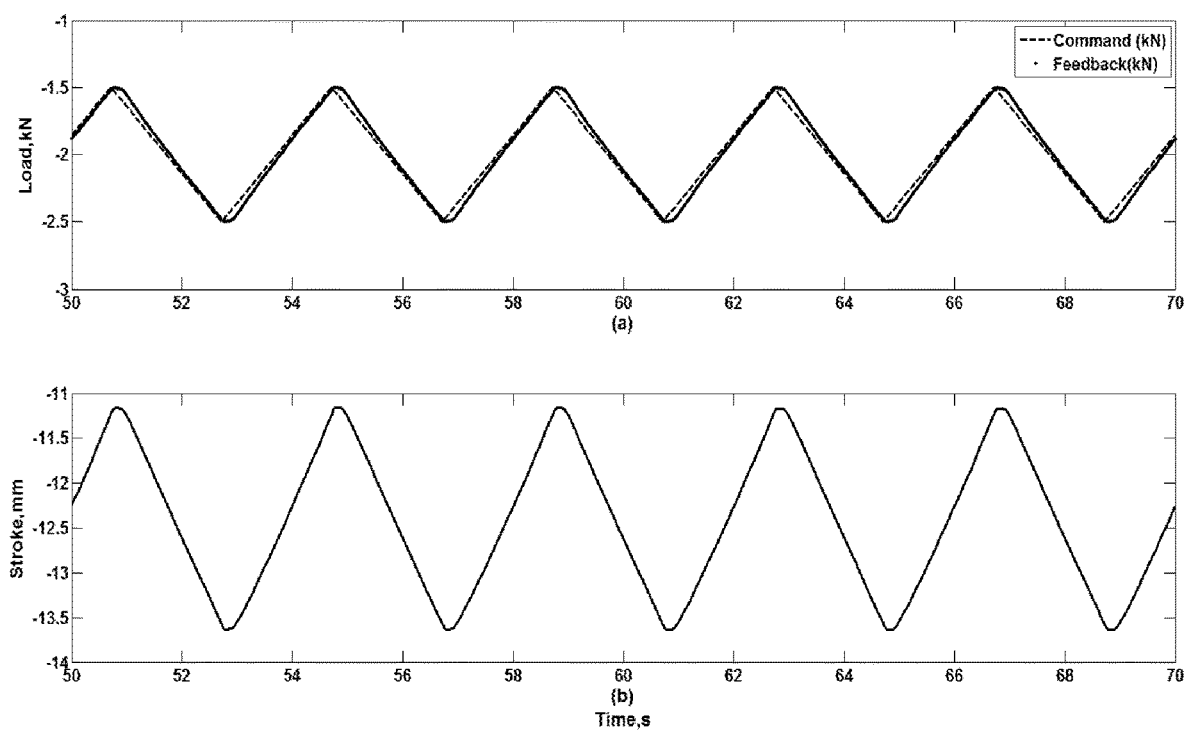
FIGS. 6A-6C illustrates time histories of a top actuator displacement and load with respect to time for slow cyclic load control in the absence of external disturbance, using control schemes listed in Table 3.
Figure 6B:
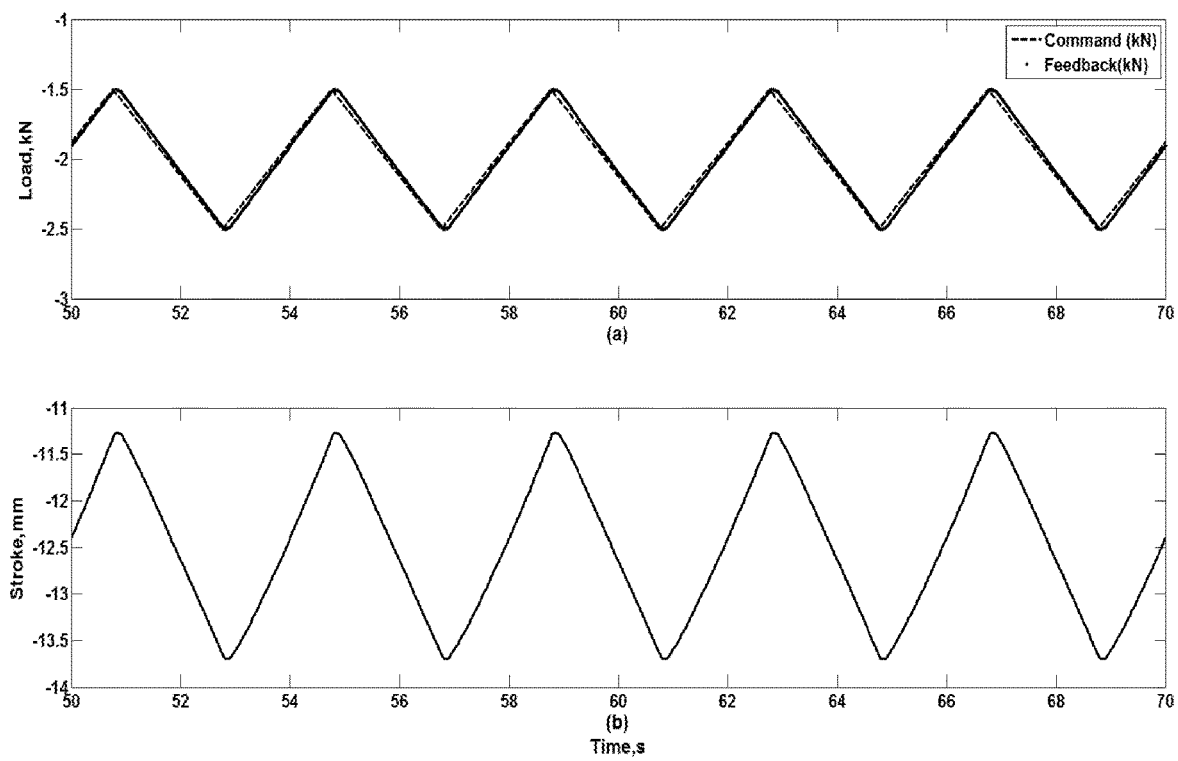
Figure 6C:
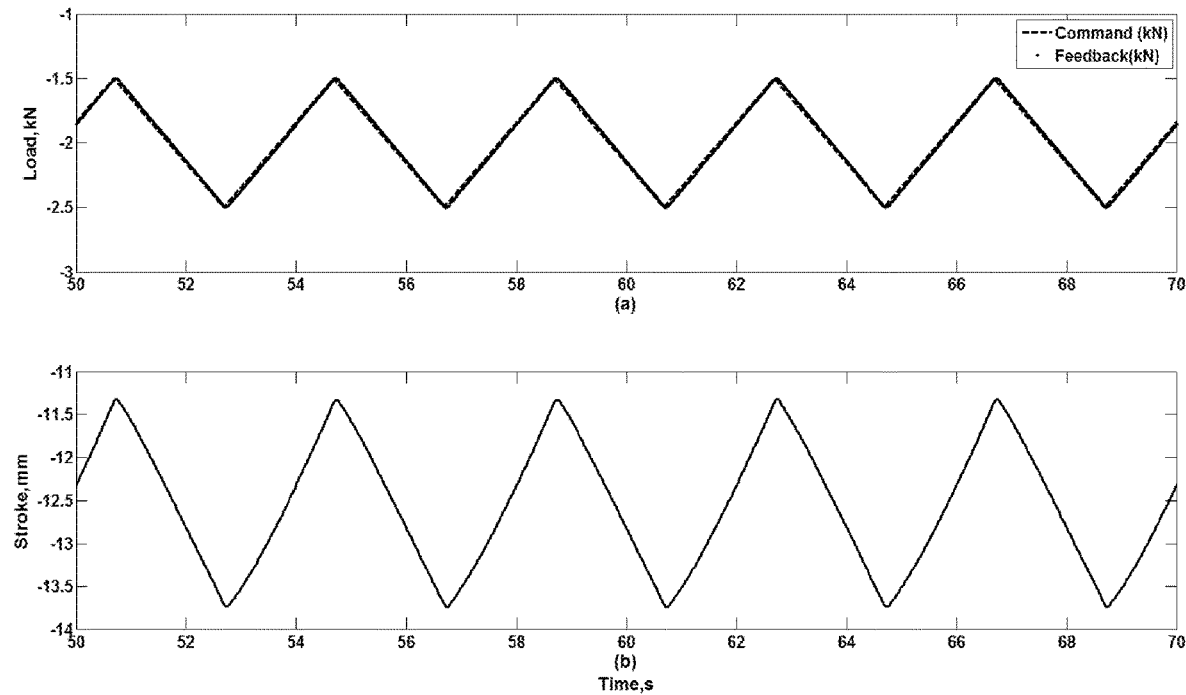
Figure 7:
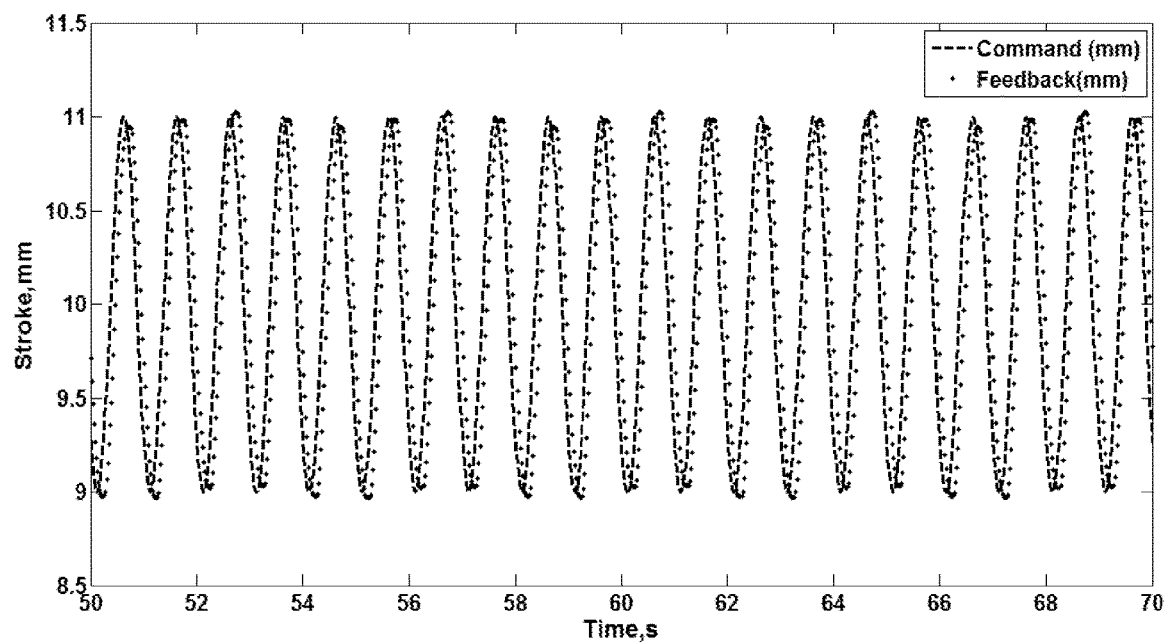
FIG. 7 illustrates time history of bottom actuator displacement as an external disturbance load case, SED1 (Table 4)
Figure 8A:
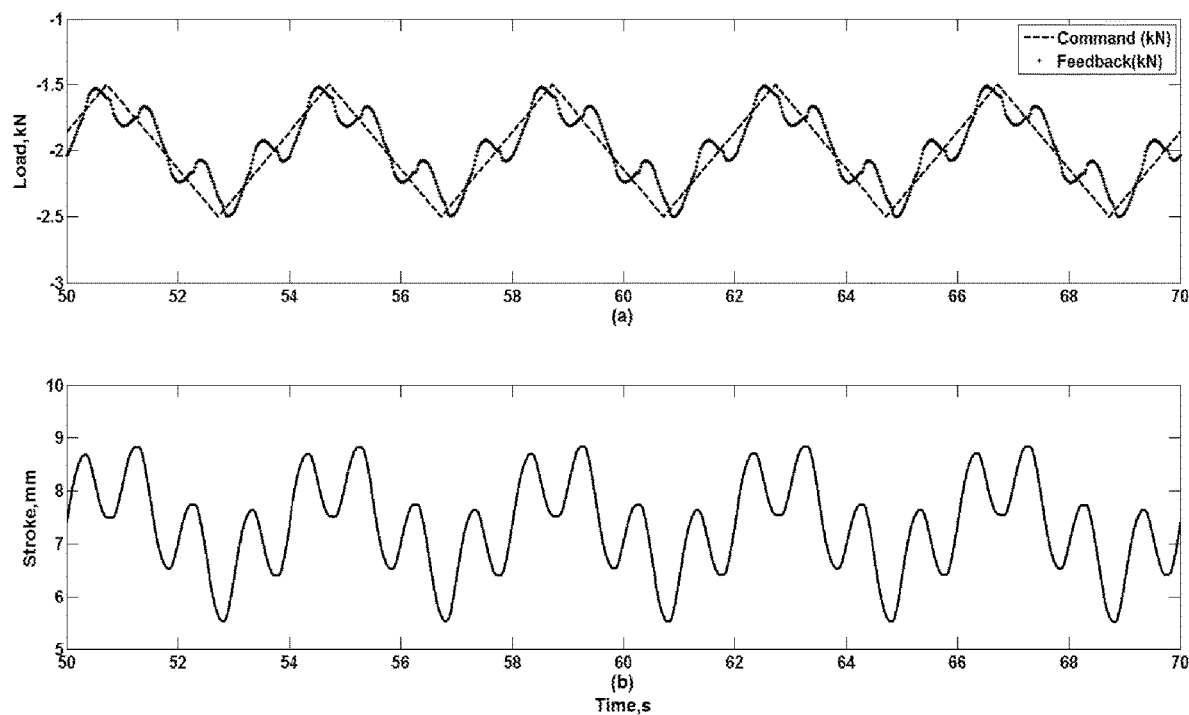
FIGS. 8A-8C show time histories of top actuator displacement and the load for slow cyclic load control in the presence of first external disturbance, SED1, as shown in FIG. 6, using control schemes listed in Table 3.
Figure 8B:
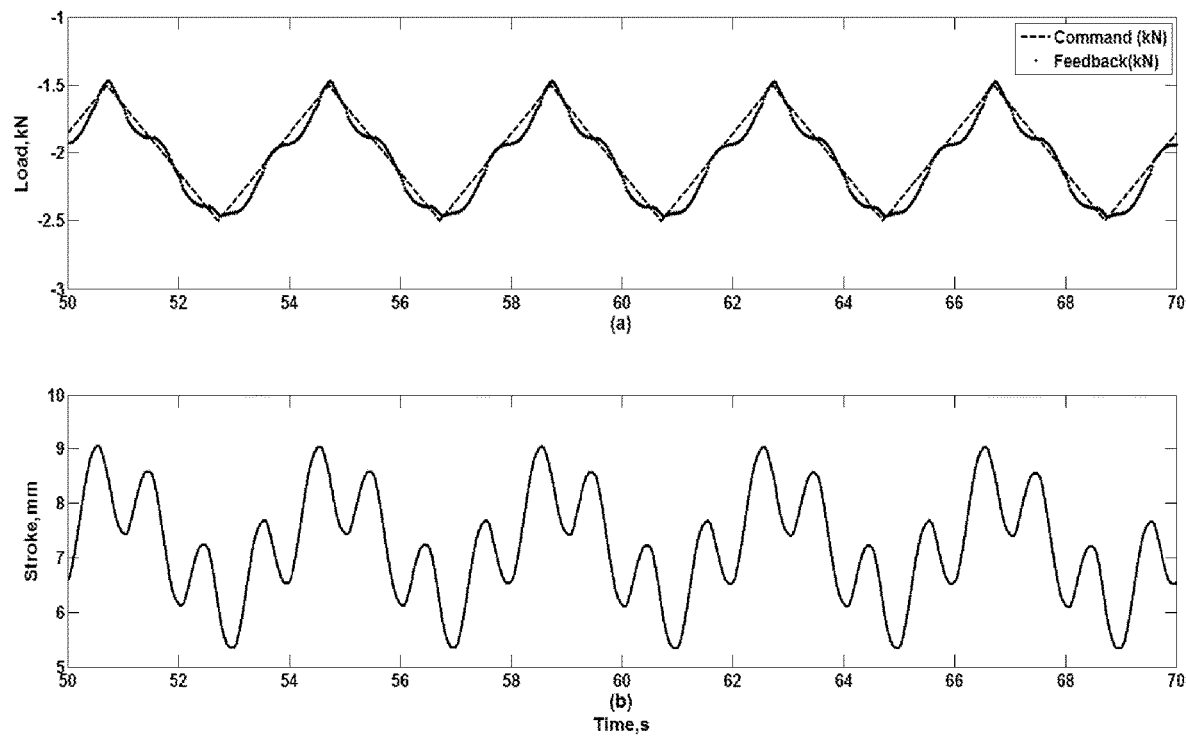
Figure 8C:
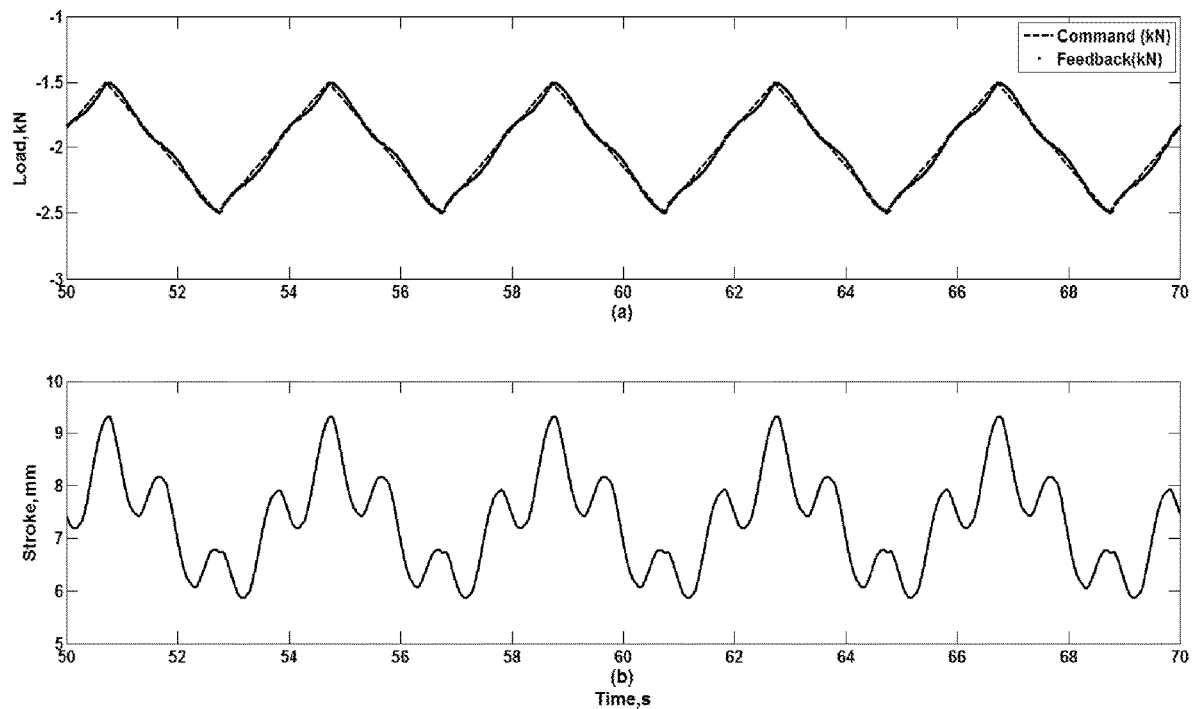

FIGS. 6A-6C illustrates a graph with time histories of top actuator displacement and a load for slow cyclic load control in the absence of external disturbance, using control schemes listed in Table 3.

TABLE 3

| Control Scheme | Description |
| --- | --- |
| Scheme-1 | PID control only |
| Scheme-2 | PID control with stiffness correction |
| Scheme-3 | PID control with predictive system stiffness correction |

FIGS. 6A-6C respectively show the control of slow cyclic loads (mean −2.0 kN, amplitude 0.5 kN and frequency 0.25 Hz) of constant velocity by the top actuator 504 with control scheme-1 (FIG. 6A), scheme-2 (FIG. 6B) and scheme-3 (FIG. 6C). It may be noted that, in these FIGS. 6A(a), 6B(a) & 6C(a), the plots with dashed line ( - - - ) and dotted line ( . . . ) respectively represent loading command and load feedback and FIGS. 6A(b), 6B(b) & 6C(b) represent displacement feedback of the top actuator 504. It is seen that the control issues noticed in FIG. 6A(a) during reversals reduce in FIG. 6B(a), furthermore in FIG. 6C(a) we see better phase control along with high fidelity command waveform tracking.

Static Loading in the Presence of Disturbance

In this section, here, we show the performance of the control schemes, listed in Table 3, to apply the desired loads on the specimen 502 by the top actuator 504 in the presence of various dynamic disturbances applied by the bottom actuator 506 on the specimen 502. Table 4 shows the parameters of the disturbance load case (SED 1 applied by the bottom actuator while top actuator 504 is required to apply slow cyclic load of constant velocity with mean −2.0 kN, amplitude 0.5 kN and frequency 0.25 Hz. Results of each test case are summarized in a set of two graphs (for example, FIG. 7 refers to time history of external disturbance SED 1 applied by the bottom actuator 506 and FIGS. 8A-8C respectively show the performance of control scheme-1, (FIG. 8A), scheme-2 (FIG. 8B), and scheme-3 (FIG. 8C) on top actuator 504 in controlling the desired static cyclic load in the presence of external disturbance SED 1). Here also, the plots in FIGS. 8A(a), 8B(a) & 8 C(a) with dashed line and dotted line respectively represent loading command and load feedback and FIGS. 8A(b), 8B(b) & 8C(b) represent displacement feedback of the top actuator 504. The effectiveness of the proposed embodiment, in applying the desired static loads in the presence of various dynamic disturbances, is seen to be superior to prior art. Table 4 shown below provides Disturbance load case imposed on the bottom actuator.

TABLE 4

| | Description | | |
| --- | --- | --- | --- |
| Disturbance from bottom actuator | Mean (mm) | Amplitude (mm) | Frequency (Hz) |
| SED 1 | 10.0 | 1.0 | 2.0 |

Dynamic Loading

Here, in this section, the demonstration of effectiveness of the proposed control scheme, in controlling the dynamic cyclic loads by the top actuator 504 on the specimen 502 in the absence and also in the presence of external disturbances dynamic in nature, is considered. The objective here is to show the effectiveness of the present embodiment to overcome the effects of loads due to inertia and dissipation in controlling desired loads with high fidelity even when geometrical and material properties of the specimen change due to external disturbances.

Dynamic Loading in the Absence of Disturbance

Figure 9A:
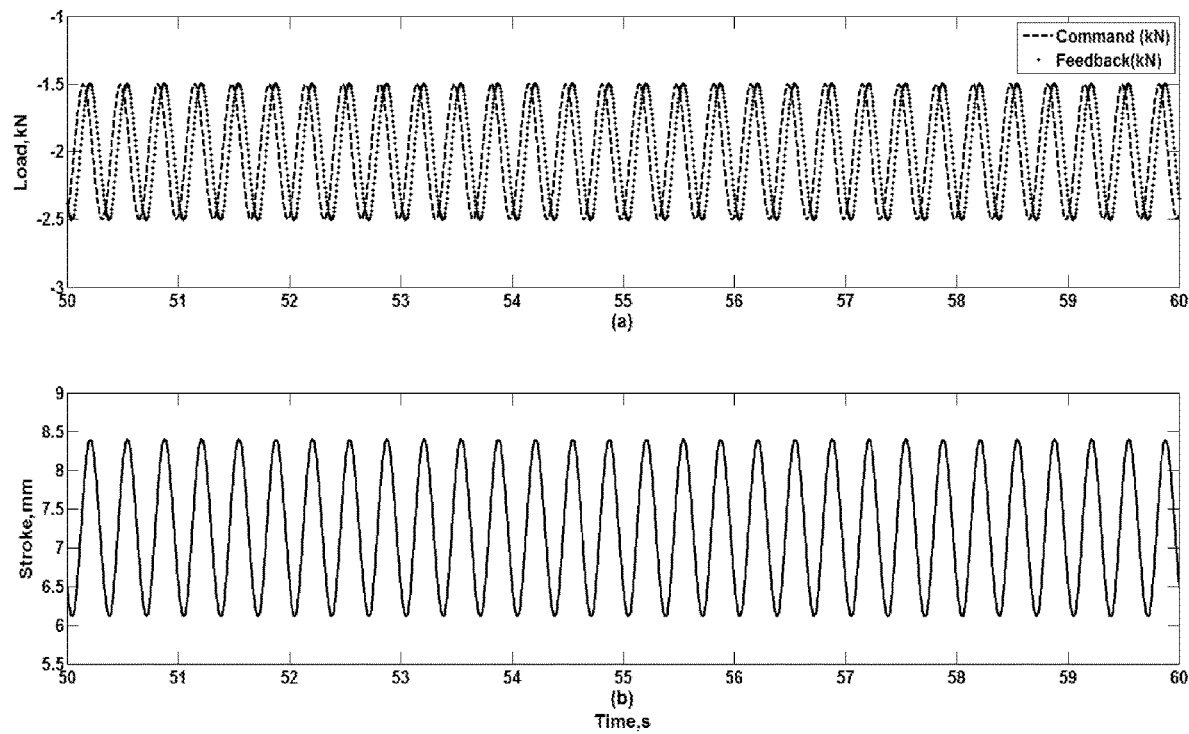
FIGS. 9A-9C illustrate time histories of the top actuator displacement and the load for a first dynamic load case, DY1, in the absence of external disturbance using control schemes listed in Table 3.
Figure 9B:
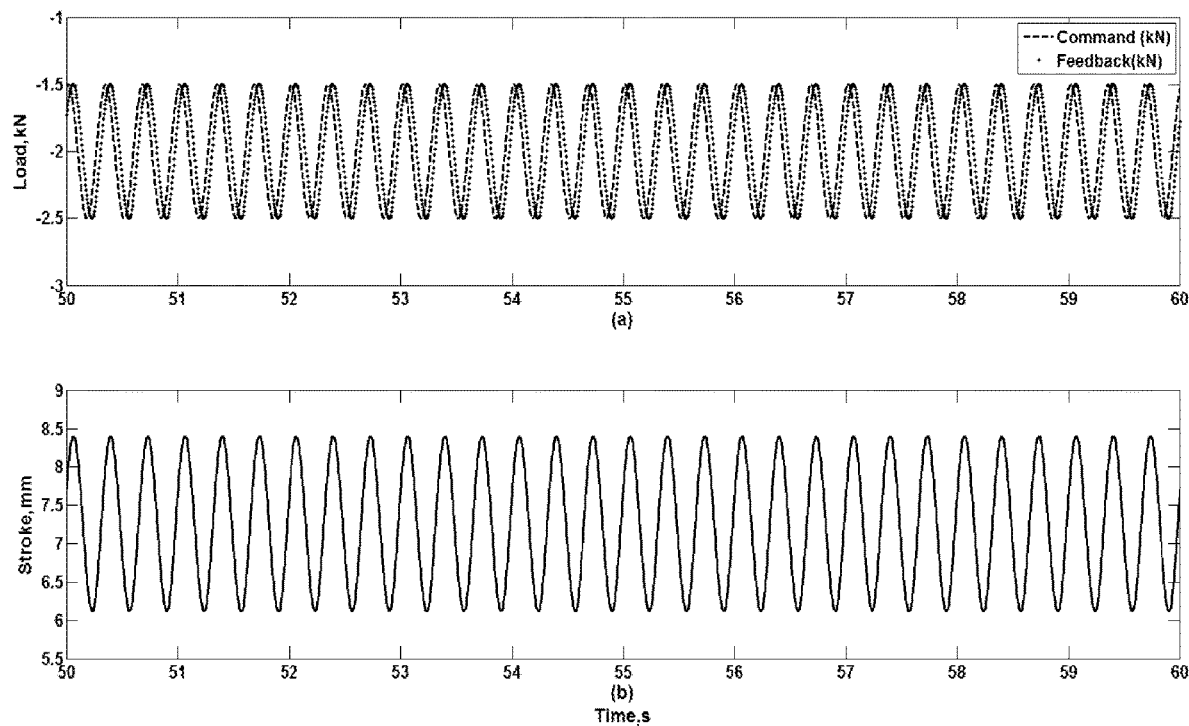
Figure 9C:
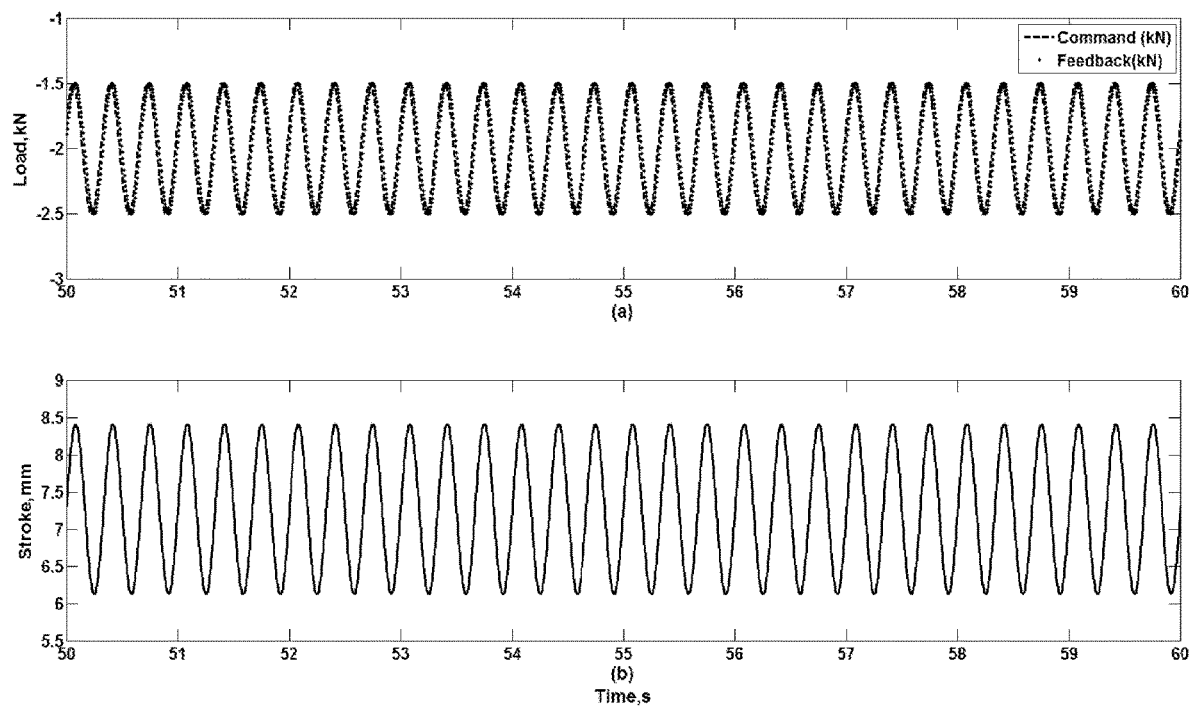
Figure 10:
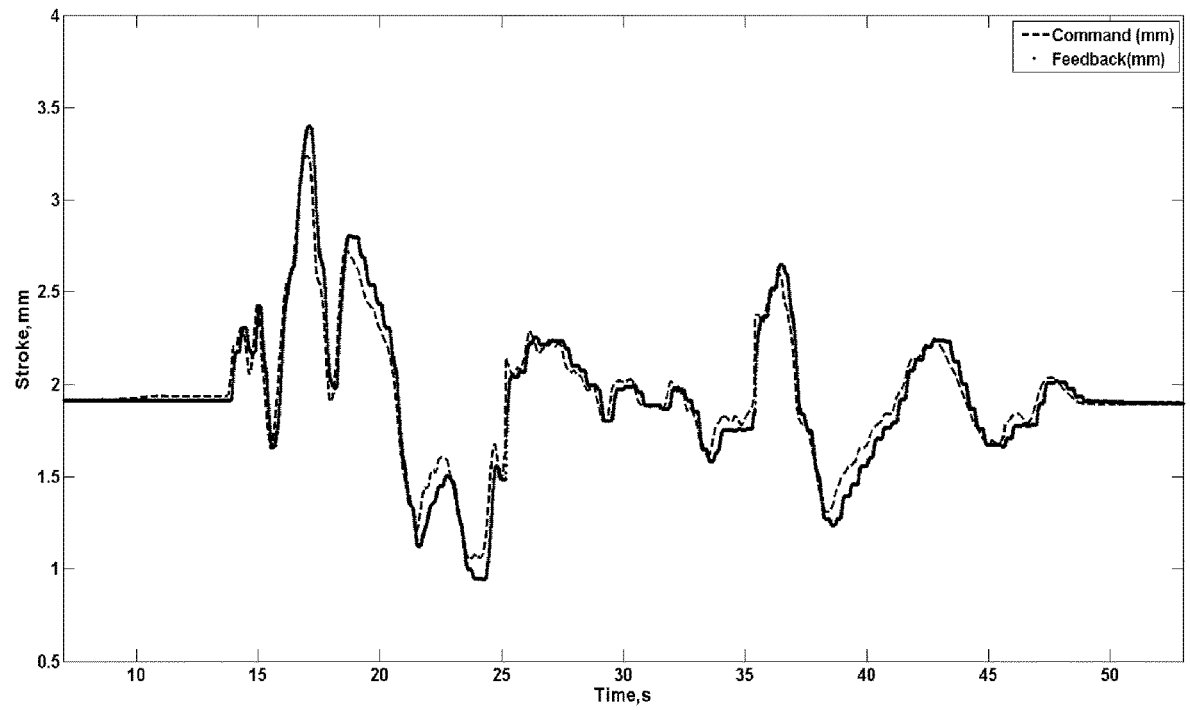
FIG. 10 illustrates time history of the bottom actuator displacement as an external disturbance in the loading case, DED1 (Table 6)

Here again, in this section, the performance of the control schemes 1-3 are studied in controlling the dynamic cyclic load in the absence of external disturbance. The details of the plots and their differentiation remain same. Table 5 below shows dynamic load case (DY 1) for which the effectiveness of the control schemes 1-3 is studied. FIGS. 9A-9C respectively corresponds to results obtained from control schemes 1-3 for the dynamic load case DY 1 with frequency 3.0 Hz. In controlling the dynamic loads over the range 1-25 Hz also the present invention with control scheme-3 merits over other two control schemes.

Table 5 Dynamic load cases imposed on the top actuator in the absence of external disturbances.

TABLE 5

| | Description | | |
| --- | --- | --- | --- |
| Dynamic Load case | Mean (kN) | Amplitude (kN) | Frequency (Hz) |
| DY 1 | −2.0 | 0.5 | 3.0 |

Dynamic Loading in the Presence of Disturbance

In this section the performance of the control methods 1-3 in controlling the desired loads (by the top actuator 504) on the specimen 502 in the presence of disturbance loads (by the bottom actuator 506) is compared. The load case (DED 1) is summarized in Table 6 (as shown below). The results corresponding to this load case are displayed in a set of two figures. For example, for load case DED 1, the first figure (FIG. 10) correspond to time history of disturbance from the bottom actuator 506 and remaining three figures (FIGS. 11A-11C) respectively correspond to time histories of desired loads controlled by control methods 1-3. FIGS. 11D-11F corresponds to zoom in windows of FIGS. 11A-11C. One may conclude from these figures that under dynamic conditions, the quality of control as well as the fidelity of rendering the desired load control waveform benefit from use of the present invention. Table 6 below provides Dynamic load cases imposed on the top actuator 504 in the presence of external disturbances.

TABLE 6

| Dynamic Load & disturbance Case | Top actuator (Desired load to be controlled) | | Bottom actuator (External disturbance) | |
| --- | --- | --- | --- | --- |
| | Amplitude (kN) | Frequency (Hz) | Amplitude (mm) | Frequency (Hz) |
| DED 1 | 0.25 | 5.0 | 0.5-3.5 mm | 0.01-15.0 Hz |

In all cases studied, it is evident that real-time stiffness correction provides substantial improvement over what is possible with conventional PID control method. Further, it is evident that the present embodiment delivers a marginal, but noticeable improvement in quality of servo control over real-time stiffness correction. However, this is achieved without the need for real-time stiffness computations along with the associated requirement of actuator stroke feedback. This underscores the importance of the use of a component from servo-output computations in computing system response and doing so in a predictive manner.

Aircraft Wing Testing for Dynamic Loads

FIG. 12 shows a test rig on which the proposed control scheme is implemented to demonstrate the simulation of loads on aircraft wing-like ladder structure, wherein the distributed load on the cantilever wing structure is simultaneously applied and controlled using multiple actuators. The test rig includes actuators (1-8), T-slot bed (9), support columns (10) to which the wing structure is rigidly connected and a wing structure (11) built-up of three I-section beams in the longitudinal direction and nine C-sections beams in the transverse direction. FIG. 13 shows the effectiveness of the proposed control scheme in simulation of desired loads on wing structure by simultaneous application of distributed loads in a controlled manner. The details of the applied distributed loads are as shown in table 7.

TABLE 7

| Actuator No. | Max. Load (kN) | Min. Load (kN) | Frequency (Hz) |
|---|---|---|---|
| 1 | 0.10 | −0.50 | 2.0 |
| 2 | 0.15 | −0.75 | 2.0 |
| 3 | 0.20 | −1.25 | 2.0 |
| 4 | 0.45 | −1.75 | 2.0 |
| 5&6 | 0.8 | −2.25 | 2.0 |
| 7&8 | 1.0 | −2.40 | 2.0 |

The present embodiment of the testing systems and method for testing specimen facilitates the following a. Use of a major component of computed Servo Output to continuously predict expected system response.

b. No requirement for measurement of any feedback other than the one being control. For example, measurement of position feedback is not required for Load Control.

c. Computation of predictive system response does not require any complex numerical model of the system.

d. All computations required for servo-control are restricted to the channel in question. This permits: (i) multi-channel load control testing without measuring displacement of each actuator (for example, multi-actuator aircraft wing testing for flight loads); and (ii) multi-axis shake table testing without the need for force or pressure measurements (for example testing of civil structure under earthquake loads to measure system parameter like stiffness).

e. As the predictive system response function does not include any additional measured parameter (other than control feedback) or its derivative, rendering quality of servo-control immune to signal noise of such feedback channel. This is of significance, particularly at higher test frequencies.

f. As servo output correction is based on predictive response characterization, phase lag between control and feedback may be eliminated without recourse to Feed-Forward scheme as in conventional PIDF schemes.

g. As predictive system response computation accounts for parameters including, but not restricted to instantaneous system stiffness, the scheme can improve servo-response response even under Position Control by improving Position waveform fidelity and eliminating phase lag.

h. This is essentially an auto-tuning system capable of accounting for continuous changes in system response and thereby rendering manual tuning redundant.

i. The virtual elimination of latency in servo-response through predictive system response tracking permits considerable increases in maximum testing frequency on multi-channel servo-control systems as is the case in full-scale testing of aircraft structures.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:

1. A test system for testing a specimen comprising:
an actuator for applying a controlled desired load to a specimen;
a drive unit connected to said actuator;
a controller connected to said drive unit, wherein said controller generates a drive signal for said drive unit based on a feedback received from said specimen and an error derived between an input command and said feedback;
wherein said controller generates said drive signal by compensating varying system parameters which are introduced due to nonlinear response of said test system and said specimen, and wherein said controller eliminates the need of (i) additional measured variables other than said feedback received from said specimen and (ii) a numerical or reference model of said test system and said specimen for compensating said varying system parameters.

2. The test system of claim 1, wherein said actuator comprises
a top actuator for applying said controlled desired loads on said specimen; and
a bottom actuator for creating external disturbance by changing displacement of said specimen.

3. The test system of claim 2, wherein said top actuator is instrumented with both force and displacement sensors which are exercised to validate Load Control against said specimen bearing against said bottom actuator, wherein said bottom actuator operates independently under Stroke Control to simulate randomly variable system stiffness as perceived by said top actuator.

4. The test system of claim 2, further comprising
a compression plate which is connected to a free-end of said top actuator and said bottom actuator, wherein said specimen placed between said compression plate.

5. The test system of claim 1, wherein said varying system parameter comprises
a first parameter which is introduced due to said specimen which undergoes changes in geometrical dimensions and material properties;
a second parameter which is introduced due to dissipation of energy among the control elements leading to under loadings; and
a third parameter which is introduced due to structure of said actuator interaction that adds energy to the system leading to overloading or control instability.

6. The test system of claim 1, wherein said controller adapted to compute a first output based on a following equation:

$$s(t)=K_{SG}(P(t)+I_2(t)+D(t)+F(t))$$

wherein $K_{SG}$ is a gain of said test system P(t) is a proportional gain, $I_2(t)$ is an integral gain and D(t) is a Feedback-derivative gain and F(t) is a Feed-forward gain.

7. The test system of claim 6, wherein said controller adapted to compute a predictive system response parameter R(t) based on said first output using the following equation:

$$R(t)=f[S(t-T_D),\Delta y(t-T_D)]$$

wherein, $T_D$ is a derivative time-constant, and y(t) is said feedback.

8. The test system of claim 7, wherein said controller adapted to compute a second output $S_C(t)$ using said predictive system response parameter based on the following equation:

$$S_C(t)=S(t)[1+K_S R(t)]$$

wherein, $K_S$ is a Gain factor on predictive flexibility ratio.

9. The test system of claim 8, wherein said controller adapted to generate said drive signal based on a following equation:

$$C(t)=A(t)+I(t)+D_f(t)$$

wherein A(t) is an attenuated component of said second output $S_C(t)$; I(t) is a static null component; $D_f(t)$ is a dither component.

10. A method for continuous correction of a gain of a controller by accounting stiffness in a test system comprises
receiving an input command;
determining an error based on said input command and a feedback received from a specimen;
generating a drive signal for a drive unit of said test system, wherein said generating said drive signal comprising
computing at least one of a proportional gain, an integral gain, a feedback derivative gain and a feed-forward gain by using said error;
computing a first output based on at least one of said proportional gain, said integral gain, said feedback derivative gain and said feed-forward gain,
computing a predictive system response parameter based on said first output and said feedback,
computing a second output based on said predictive system response parameter and said first output,
processing said second output to obtain a processed output; and
generating said drive signal based on said integral gain, a dither component and said processed output; and
feeding said drive signal to said drive unit of said test system.

11. The method of claim 10, wherein said processing of said second output comprises
correcting said second output for a potential bias created due to a response of an actuators in said testing system;
attenuating said second output by a system gain constant after correcting said second output for said potential bias.

12. The method of claim 10, wherein said predictive system response parameter is computed based on said first output and a differential component of said feedback.

13. The method of claim 10, wherein said first output computed based on a following equation:

$$s(t)=K_{SG}(P(t)+I_2(t)+D(t)+F(t))$$

wherein $K_{SG}$ is a gain of said test system P(t) is a proportional gain, $I_2(t)$ is an integral gain and D(t), is a Feedback-derivative gain and F(t) is a Feed-forward gain.

14. The method of claim 13, wherein said predictive system response parameter R(t) computed based on said first output using the following equation:

$$R(t)=f[S(t-T_D),\Delta y(t-T_D)]$$

wherein, $T_D$ is a derivative time-constant, and y(t) is said feedback.

15. The method of claim 14, wherein second output $S_C(t)$ computed using said predictive system response parameter based on the following equation:

$$S_C(t)=S(t)[1+K_S R(t)]$$

wherein, $K_S$ is a Gain factor on predictive flexibility ratio.

16. The method of claim 15, wherein said drive signal generated based on a following equation:

$$C(t)=A(t)+I(t)+D_f(t)$$

wherein A(t) is an attenuated component of said second output $S_C(t)$; I(t) is a static null component; $D_f(t)$ is a dither component.

* * * * *